April 7, 1953  J. E. RAY  2,633,660

FLY ROD BAIT

Filed Aug. 12, 1949

James E. Ray
INVENTOR.

BY *Thomas A. O'Brien*
*and Harvey B. Jacobsen*
Attorneys

Patented Apr. 7, 1953

2,633,660

UNITED STATES PATENT OFFICE 2,633,660

FLY ROD BAIT

James E. Ray, Birmingham, Ala.

Application August 12, 1949, Serial No. 109,967

1 Claim. (Cl. 43—42.27)

This invention relates to fly rod baits, and more particularly to artificial lures for use in casting for bass or other fish of similar habits.

An object of this invention is to provide a bait which will imitate the actions of a live dragon-fly trying to rise from the surface of a body of water, by making the head portion of buoyant material, and the body of the lure of water absorptive material.

Various additional objects of the invention will later become apparent as the following description of this fly rod bait proceeds, preferred embodiments of which have been illustrated, by way of example only, in the accompanying drawings, wherein.

Figure 1:
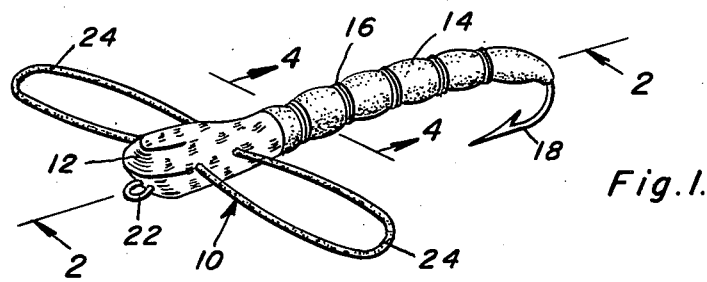
Figure 1 is a perspective view of a preferred embodiment of the fly rod bait.
Figure 2:
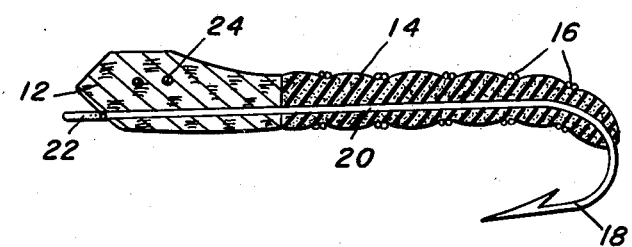
Figure 2 is a vertical longitudinal sectional view taken on the line 2—2 of Figure 1.
Figure 3:
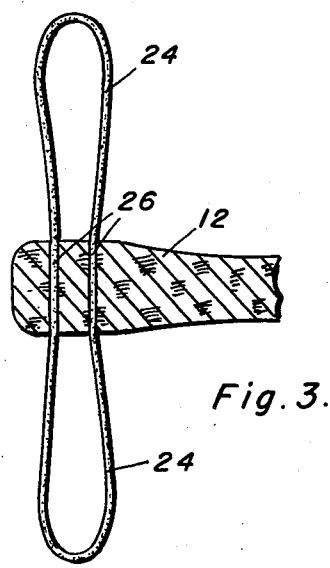
Figure 3 is a fragmentary horizontal sectional view of the front portion of the invention showing emplacement of the wings within the head portion.

With continued reference to the drawing, wherein like reference numerals designate similar parts throughout the various figures, attention is directed first to Figures 1 through 4 which illustrate the first species of fly rod bait. This fly rod bait is generally designated by reference numeral 10 and comprises various members which are individually shaped and assembled to simulate the appearance of a dragon-fly. The head portion 12 is preferably formed of cork, but may be alternately made of another easily workable material of high buoyancy. A body portion 14, preferably constructed of sponge rubber, is secured to the rear of the head portion 12. The body portion may be made of an alternate water-absorbent material. However, sponge rubber has been found to be the most effective material used for the desired functions of the body. Bands 16 of nylon or rubber are positioned in spaced relationship so as to encompass and compress the body 14 and divide it into a plurality of segments, thus imitating the articulated structure of a dragon-fly. A hook is extended through the head and body with its barbed end 18 extending downwardly from the rear of the body. The shank 20 of the hook extends throughout the length of the body and the head portion and terminates adjacent the front of the head portion in an eye 22. An optional manner of placing the hook within the body and head would be to thread the body and head portion on the hook from the eye end; the eye not having been formed until after the body and head portion have been so positioned. The body portion is secured to the head portion by means of an adhesive, such as latex or the like.

Wings 24 are secured to the head 12 of the bait and comprise a transverse loop having its ends extending without the head portion to form the wings 24, and a central section 26 which is secured within the head portion 12. The central section 26 has its two opposed portions positioned so that the rear one is higher whereby the wings 24 are angularly disposed to the horizontal and to the shank 20 of the hook. In addition, the central portions 26 are secured within the head with the opposed portions in closer relationship than opposed portions of the wings 24 outside the head. The wings 24 may be made of an integral loop and secured in the head by optionally cutting slots in the head portion, positioning the loop and then filling the slots to rigidly secure the wings 24 therein. Alternately, the loop may be formed out of a single strand which may be joined at its ends, after being pushed through suitable apertures in the head. These wings may be formed of rubber or nylon and may be optionally painted to better simulate the wings of an insect. The wings produce the illusion of a pair of transparent wings of an insect when the lure is in flight, or has alighted on the water.

As will be readily understood, the body of sponge rubber will absorb enough water when the lure has aligned on the water to cause the rear end of the bait to drag, while the head portion keeps the front end high by its buoyancy. This will cause the bait to simulate the action of a dragon-fly trying to rise from water, and by merely flicking the rod tip, the fisherman can impart a highly realistic action to the lure.

Figure 5:
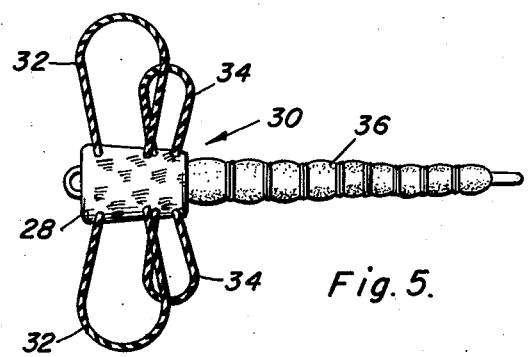
Figure 5 is a top plan view of another embodiment of the present invention.
Figure 4:
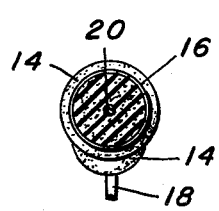
Figure 4 is a vertical transverse sectional view taken on the line 4—4 of Figure 1.

Referring now to Figure 5 which indicates in plan view another species of the fly rod bait, it can be seen that the head portion 28 of this lure, generally designated as 30, has a pair of wing-forming loops positioned within it. An upper loop of relatively large size provides forward wings designated by reference numeral 32. A smaller loop provides secondary wings to the rear of and below the wings 32, which are indicated by numeral 34. These wings are made of nylon leader and are striped to simulate best the wings of a live insect. The body portion 36 of this embodiment is similar to that of the embodiment of Figures 1 through 4 as is the hook.

Since numerous embodiments may be utilized falling within the spirit and principle of this invention, it is not desired to limit the latter to the exact construction shown and described, except as required by the scope of the following claim.

Having described the invention, what is claimed as new is:

A fly rod bait comprising a buoyant head portion of cork and a body portion of sponge rubber attached to said head portion, a hook including a shank extending longitudinally through said head and body portions, and an endless strand of flexible material mounted on the head portion and including laterally projecting loops representing wings, said strand further including uniformly spaced, parallel intermediate portions extending transversely through the head portion at longitudinally spaced points for sustaining the loops.

JAMES E. RAY.

REFERENCES CITED

The following references are of record in the file of this patent:

UNITED STATES PATENTS

| Number | Name | Date |
|---|---|---|
| Re. 21,553 | Bouton | Sept. 10, 1940 |
| 370,465 | Francis | Sept. 27, 1887 |
| 1,444,390 | Rohrbach | Feb. 6, 1923 |
| 1,490,389 | Hayes | Apr. 15, 1924 |
| 1,926,459 | Sisco | Sept. 12, 1933 |
| 2,055,841 | Haislip | Sept. 29, 1936 |
| 2,112,180 | Stoddard | Mar. 22, 1938 |
| 2,231,949 | Rinehart | Feb. 18, 1941 |
| 2,242,708 | Lancaster | May 20, 1941 |